United States Patent [19]

Spehar

[11] Patent Number: 5,056,729
[45] Date of Patent: Oct. 15, 1991

[54] PORTABLE MACHINE FOR DISPENSING ROLL GOODS

[76] Inventor: Eli G. Spehar, 19441 Perch Cir., Huntington Beach, Calif. 92646

[21] Appl. No.: 267,040

[22] Filed: Nov. 4, 1988

[51] Int. Cl.⁵ .......................... B65H 19/20; B26D 7/00
[52] U.S. Cl. ............................... 242/56.2; 242/56 R; 83/649
[58] Field of Search ....................... 83/649, 44, 45, 56, 83/212.1, 408; 242/56.2, 56 R

[56] References Cited

U.S. PATENT DOCUMENTS

| | | | |
|---|---|---|---|
| 3,760,669 | 9/1973 | Rosenthal | 83/63 |
| 3,786,705 | 1/1974 | Dorfel | 83/71 |
| 3,788,175 | 1/1974 | Davis | 83/83 |
| 3,967,519 | 7/1976 | Esterly | 83/455 |
| 4,817,882 | 4/1989 | Brewer, Sr. et al. | 242/56 R |
| 4,827,817 | 5/1989 | Grohoski et al. | 83/649 X |
| 4,827,818 | 5/1989 | Stringfellow | 242/56.2 X |

*Primary Examiner*—Daniel P. Stodola
*Assistant Examiner*—John P. Darling

[57] ABSTRACT

The invention relates to the cutting of the web of rolled goods such as paper or plastic film and more specifically to the cutting and accurate dispensing of thin, tinted or coated plastic films used as a thermal barrier when bonded to window glass. A master roll is rotatably mounted. Film lengths are removed manually by pulling the film off the roll. A protective cover sheet is automatically stripped by a secondary roll. A counter indicates the length of material removed and a foot lever actuates a cutting blade to shear the length removed. A display indicates the length of film remaining on the supply roll.

7 Claims, 5 Drawing Sheets

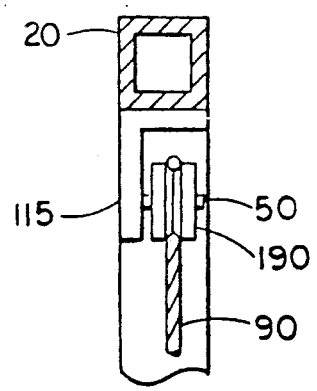 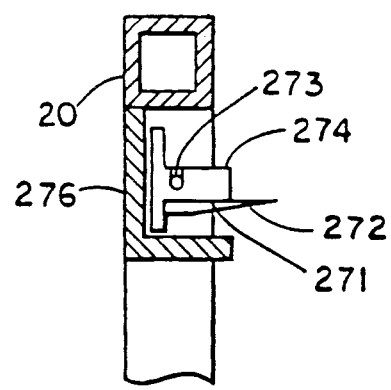
FIG. 2  FIG. 3
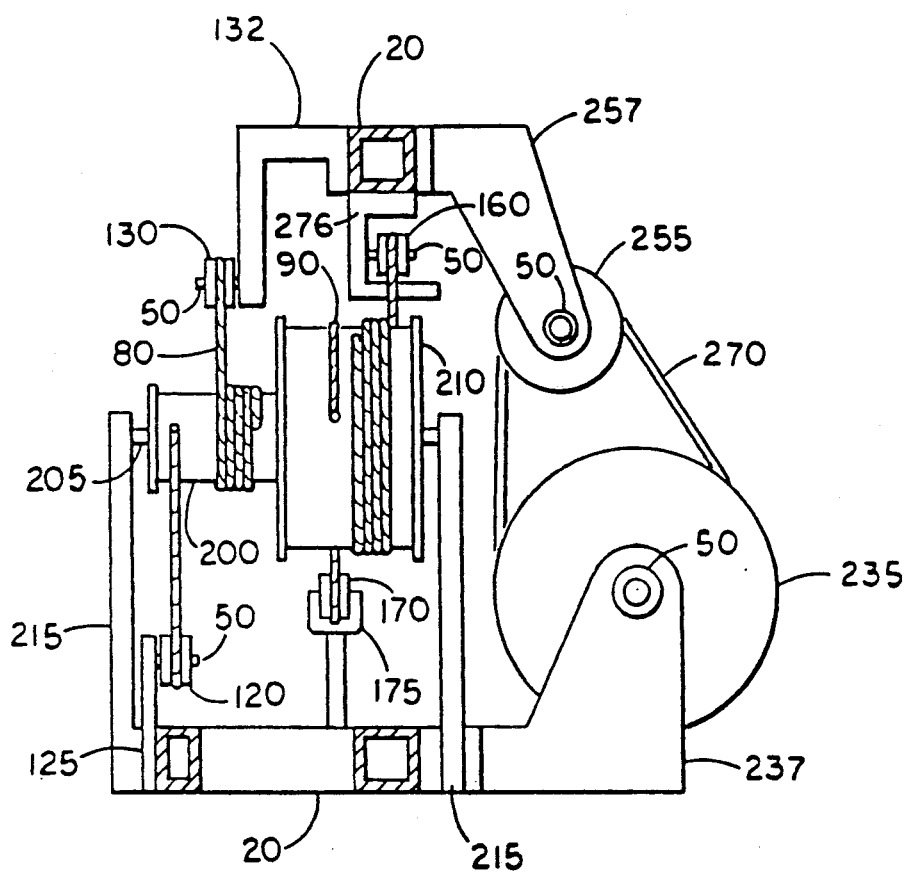
FIG. 4

PORTABLE MACHINE FOR DISPENSING ROLL GOODS

FIELD OF THE INVENTION

The invention relates to cutting and dispensing materials which are stored as rolls. These materials may be paper, cloth or plastic sheets. More specifically the invention relates to the cutting both longitudinally and laterally, and accurate dispensing of plastic rolled material used as a thermal barrier when bonded to window glass.

BACKGROUND OF THE INVENTION

A large industry has grown up around the need for thermal plastic sheet materials used as a barrier against the heat of sunlight incident upon windows and glass walls in buildings. The soaring cost of energy coupled with the ever growing glass areas in contemporary buildings has generated a strong demand for window coverings and especially for transparent films which block the infrared energy of sunlight.

Thermal rejection films consist of one or more layers of transparent plastic film having colorations through tinting, metallization or other means. The film is bonded to the interior of window glass using adhesive agents. The practise has become wide spread and is used now for automobile windows as well as for buildings. For buildings with glass windows or walls which are not otherwise treated to reject thermal energy, it has been found that installation of such films quickly pays for itself by lowering air conditioning expense in the summer and heating costs in winter. Additionally, those who sit at or near windows find it more comfortable when the glass is so insulated.

The installation method includes cleaning of the interior of the window glass, wetting the glass, cutting the film to appropriate width, cutting the film to appropriate lengths, stripping a protective layer from the tinted film, laying the film against the moistened window glass, and applying pressure to squeeze out both moisture and air allowing the film to make intimate contact with the glass. Quality film stock has a scratch resistant coating on the outside so that the installation is more or less permanent. Because the cost of installation is a significant factor in determining the practicality of its use, improvements to film quality and reduction of installation costs are of importance.

There are a large number of machine designs in use for the shearing or cutting and dispensing of rolled goods. Examples include U.S. Pat. No. 3,786,705 to Dorfel which teaches a means for slitting a web longitudinally into at least two narrower webs, U.S. Pat. No. 3,760,669 to Rosenthal and Matsouka, and also U.S. Pat. No. 3,788,175 to Davis which teaches several means for unwinding and laterally cutting off measured lengths of a stock roll, and U.S. Pat. No. 3,967,519 to Esterly which teaches the multidirectional cutting of a web. These machines are large, heavy and not suitable for use in the field.

The prior art does not disclose a means for measuring and slitting window film to width, measuring and cutting it to length, indicating length of film left on the supply roll, and dispensing said precut pieces with backing film automatically removed; ready for installation. There is a particular absence of prior art teaching of portable equipment intended for the above purpose. It is the applicant's opinion that the present invention is new in these and other respects to be shown herein.

SUMMARY OF THE INVENTION

According to the invention there is provided a lightweight structure for the storing of a supply roll of thermal barrier film and the dispensing of ready to apply pieces for the tinting of glass windows and walls. The lightweight structure contains a means for mounting a supply roll, a means for unwinding the supply roll while simultaneously removing and storing a backing sheet from the web, a means for longitudinally slitting the web of the supply roll as it is removed, a means for laterally cutting off the web in order to remove a measured length of the slitted web, and a means for indicating the length of the original stock roll which remains.

Accordingly, the principal object of the present invention is to provide a novel portable roll goods dispensing machine being light enough to carry onto a tall ladder for the installation of tinted window film or the like.

It is one object of the instant invention to provide a new and unique device which is designed to overcome the considerable drawbacks found in prior art devices.

Another object and prominent feature of the within invention disclosed herein is to provide an integral machine which is extremely light making it easy to use in the field and especially on high ladders.

Another important and primary object of the invention disclosed herein is to provide a smaller, more compact overall package which can produce the results of much larger machines.

A further object is to provide a means for the simultaneous precision longitudinal slitting to width of said film while measuring and then cutting to length pieces matching the dimensions of existing glass windows or walls as measured accurately on the job site.

A still further object is to provide a novel light weight cutting blade drive mechanism capable of making precision cuts of a web approximately 60 inches in width where each cut requires only the actuation of a simple foot pedal and without the use of electrical or other internal or external drive power.

These, together with the various ancillary objects and features of the invention which will become apparent as the following description proceeds, are attained by this film dispensing machine. Preferred embodiments thereof being shown in the accompanying drawings, by way of example only.

DESCRIPTION OF THE DRAWINGS

FIG. 2 is a partial side sectional view with cable holding means visible.

FIG. 3 is a partial side sectional view with shuttle and blade visible.

FIG. 4 is a side sectional view showing drive and driven drums, supply and stripping roll pulleys and details of cable routing.

DESCRIPTION OF THE PREFERRED EMBODIMENT

Figure 1:
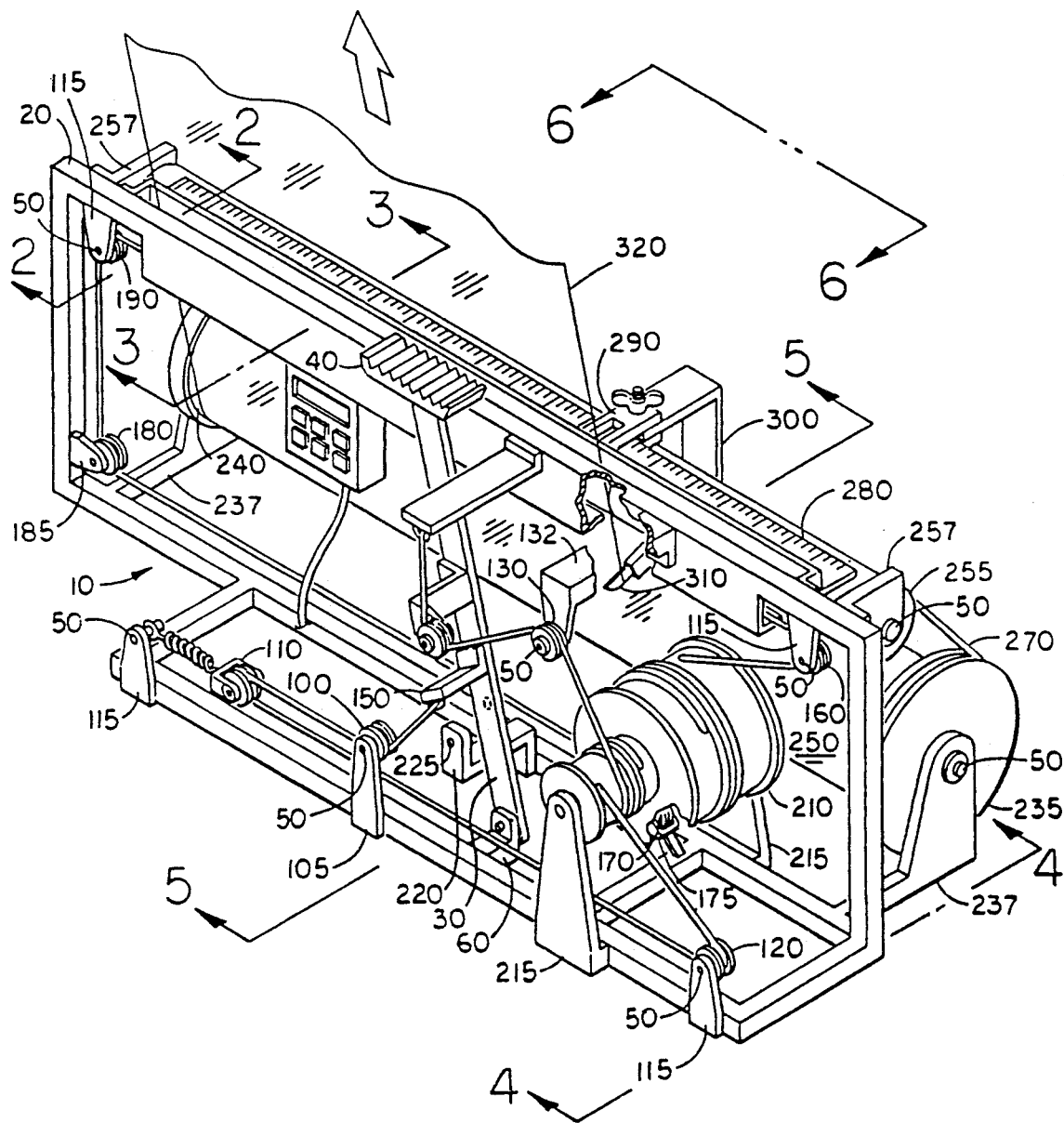
FIG. 1 is a perspective drawing of the instant invention.

FIGS. 1 through 6 show construction details of the preferred embodiment of the present invention, a portable machine for dispensing roll goods 10. A frame 20 made of aluminum or other light but rigid metal is welded as a rectangular structure having a wide and stable base and an assortment of standoffs for mounting the various active parts of the machine. A rigid lever arm 30 with a pedal 40 at its upper end is mounted at its lower end to standoff A 60 with pivot pin 50.

A drive drum 200 is rigidly attached side-by-side to a driven drum 210 and together are mounted upon a common drum axel 205 so that they are free to rotate together. Drum axel 205 is held at both ends by axel standoff 215.

First cable 70 is pivotally fixed at standoff B 150 and then routed through; pulley A 100 rotationally supported by standoff C 105, spring mounted pulley 110 supported by standoff D 115, pulley B 120 rotationally supported by standoff E 125, to drive drum 200 where it is attached.

Second cable 80 is pivotally fixed at standoff F 140 which is attached to frame 20, and then routed through; pulley C 136 rotationally supported by standoff G 137, pulley D 130 rotationally supported by standoff H 132, to drive drum 200 where it is coiled four revolutions in the clockwise direction before being attached to drive drum 200.

Third cable 90 is attached to driven drum 210, coiled four revolutions in the counterclockwise direction around driven drum 210 and then routed through; pulley E 170 rotationally supported by standoff I 175, pulley F 180 rotationally supported by standoff J 185, pulley G 190 rotationally supported by standoff K 195, pulley H 160 rotationally supported by standoff L 165, to driven drum 210 where it is attached. Between pulley G 190 and pulley H 160, third cable 90 travels through cutoff blade guide 276. Cutoff blade 272 is attached to cutoff blade holder 274 with double sided tape 271. Third cable 90 is routed through mounting slot 273 in cutoff blade holder 274.

Figure 5:
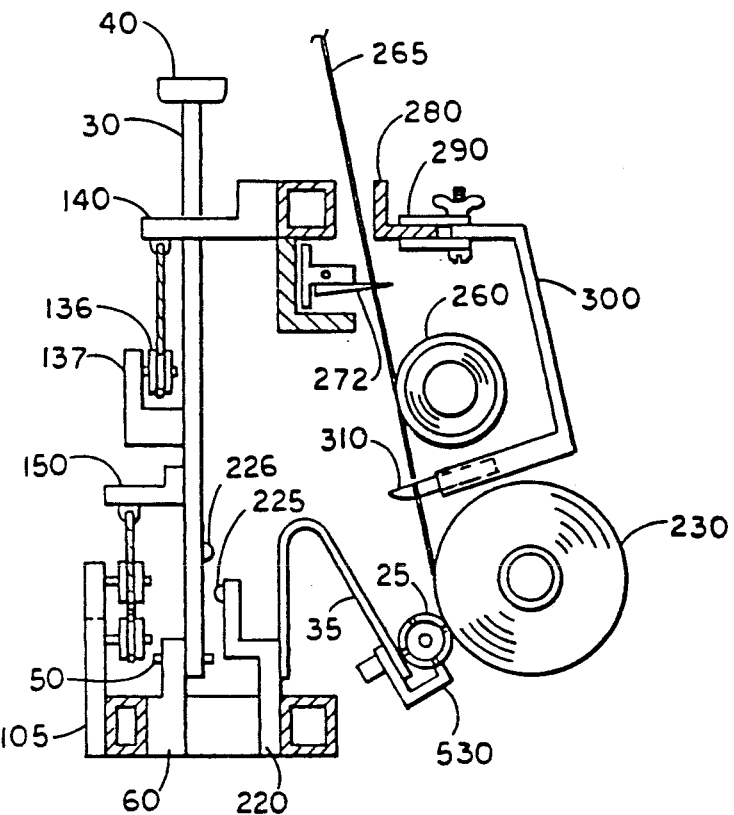
FIG. 5 is a side sectional view showing the lever arm, remote switch, optical encoder, supply and stripping rolls, film guide and slitting device.
Figure 11:
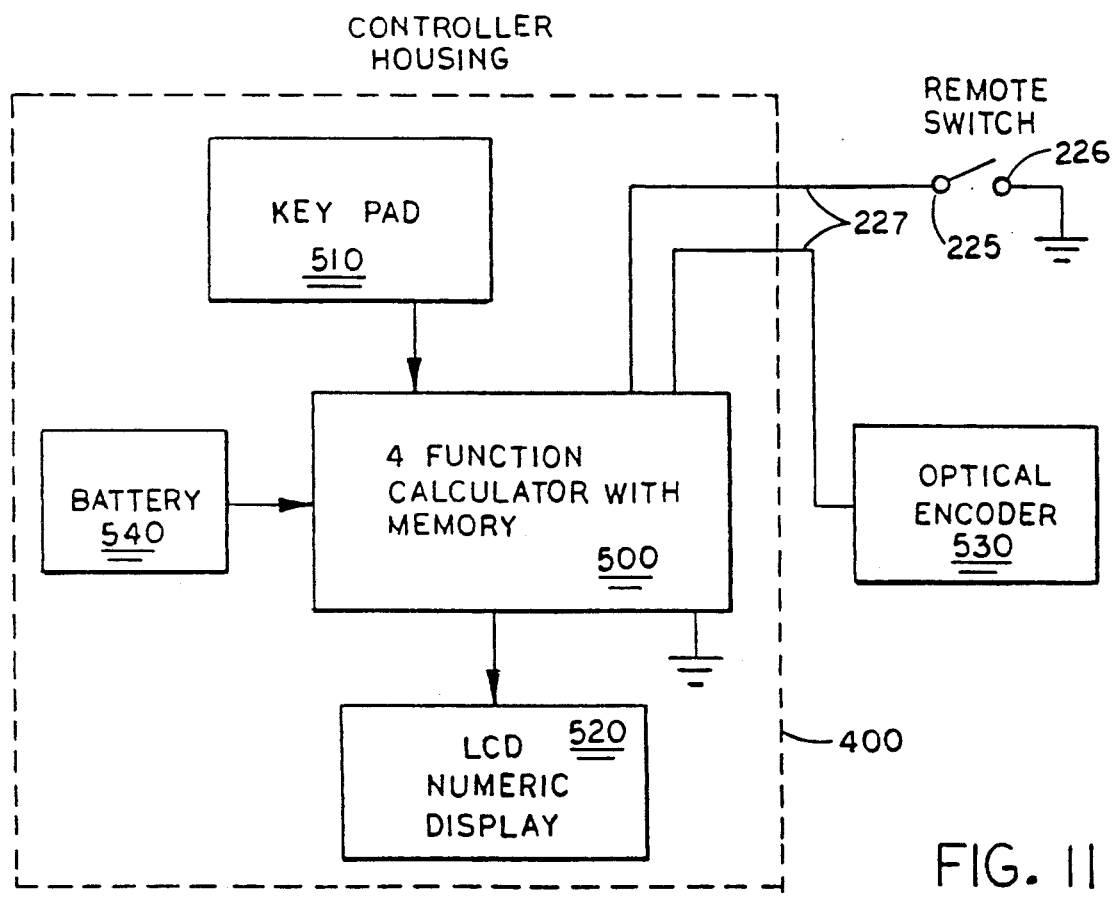
FIG. 11 is a schematic representation of the electronic system which measures film removed and keeps track of film left on the supply roll.

FIG. 5 shows details of the electrical measurement and control system. Ground contact 226 is mounted on the side of lever arm 30 and serves as an electrical ground path through frame 20. Signal contact 225 is insulatedly mounted on switch standoff 220. Optical encoder 530 is mounted on spring support 550 attached to switch standoff 220 and is held, by spring action, in physical contact with supply roll 230. Cable 227 interconnects optical encoder 530 with controller housing 400. FIG. 11 shows the electrical interconnections. Controller housing contains keypad 510, calculator 500, battery power source 540 and numeric display 520. Both insulated signal contact 225 and optical encoder 530 are interconnected with calculator 500 through cable 227.

Figure 6:
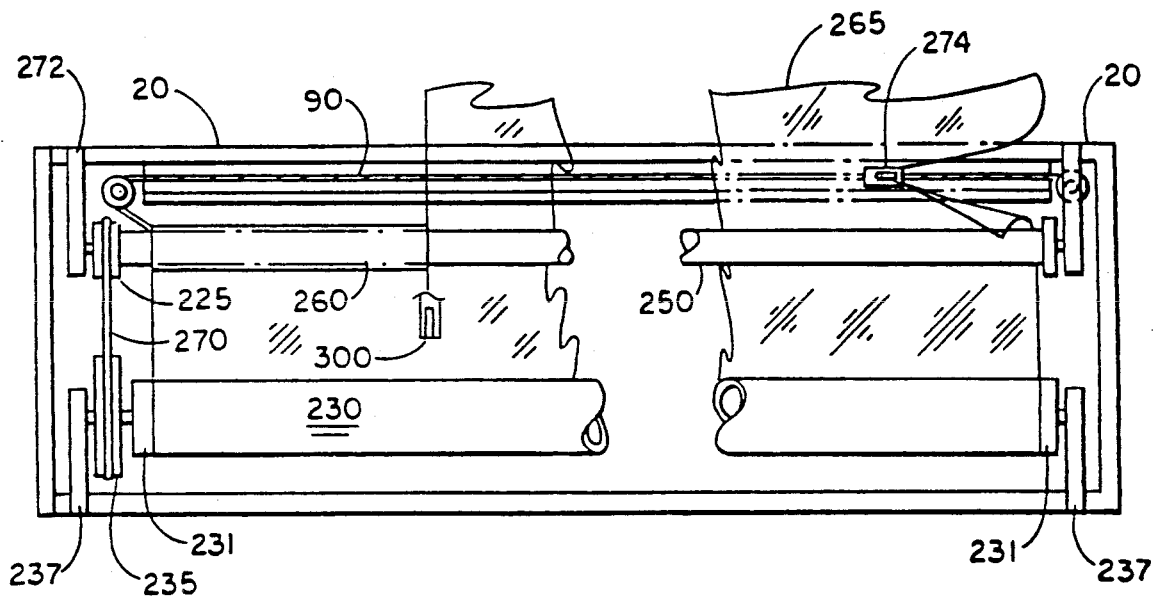
FIG. 6 is a rear view of the invention teaching the method of dispensing and slitting film as well as details of supply and stripping roll mounting and drive.
Figure 7:
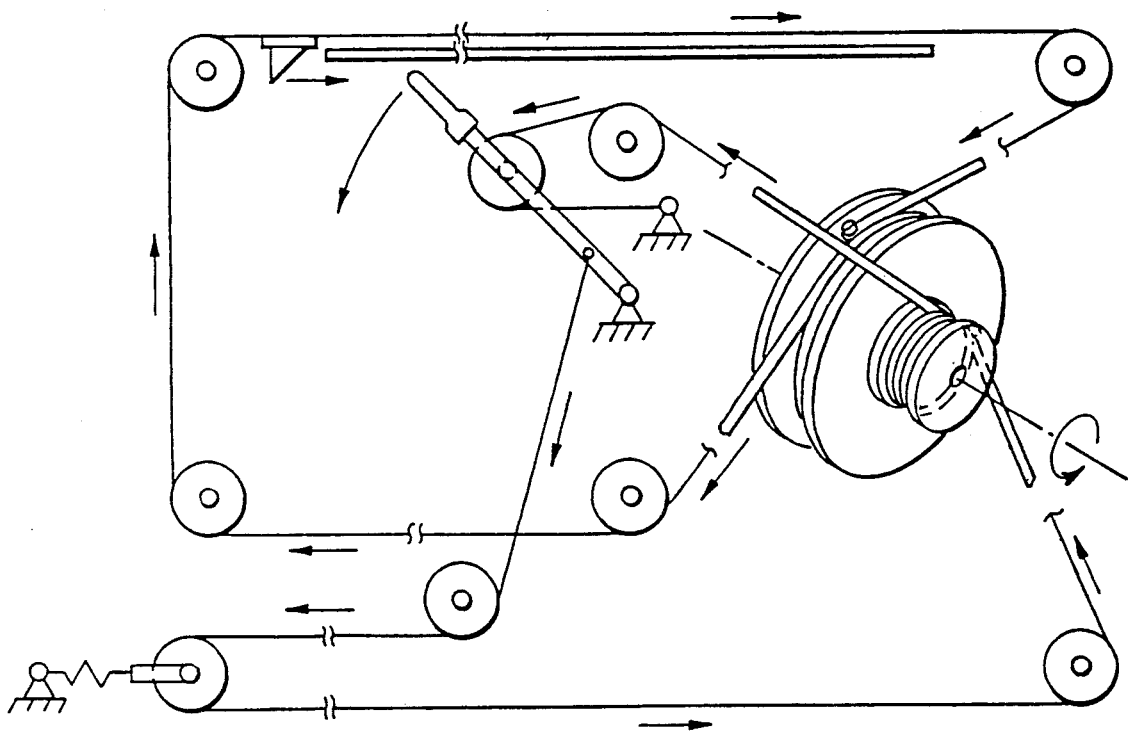
FIGS. 7 and 8 are schematic representations of the cutoff blade drive mechanism before and after lever arm actuation.
Figure 8:
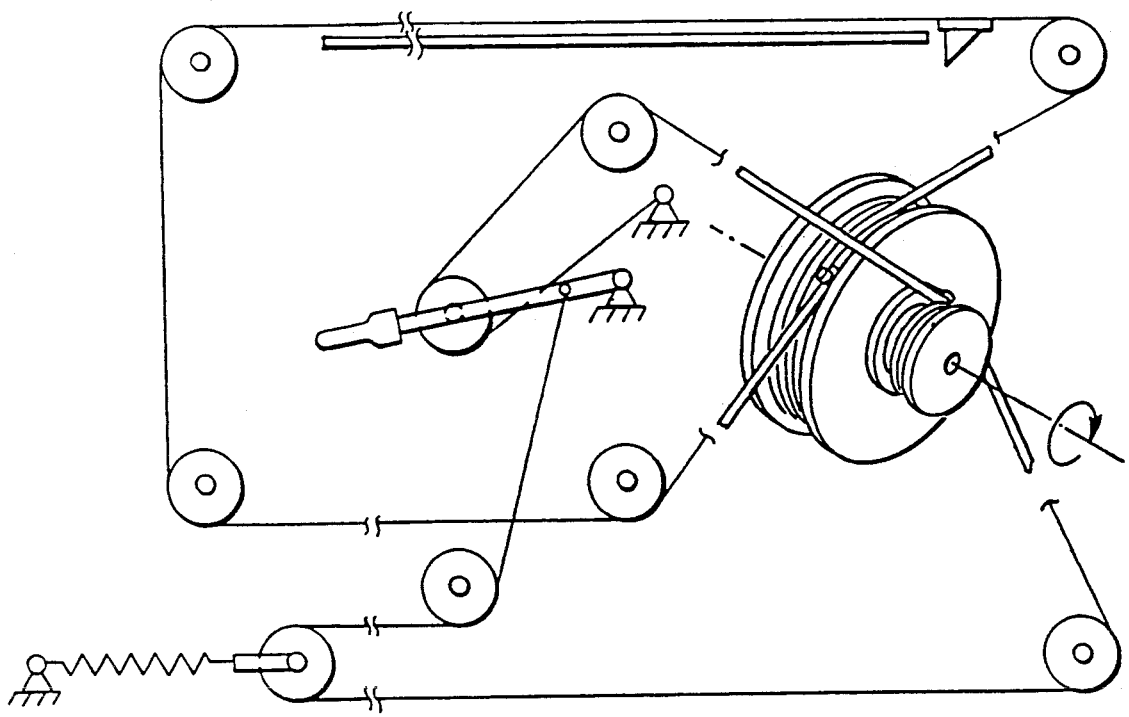
Figure 9:
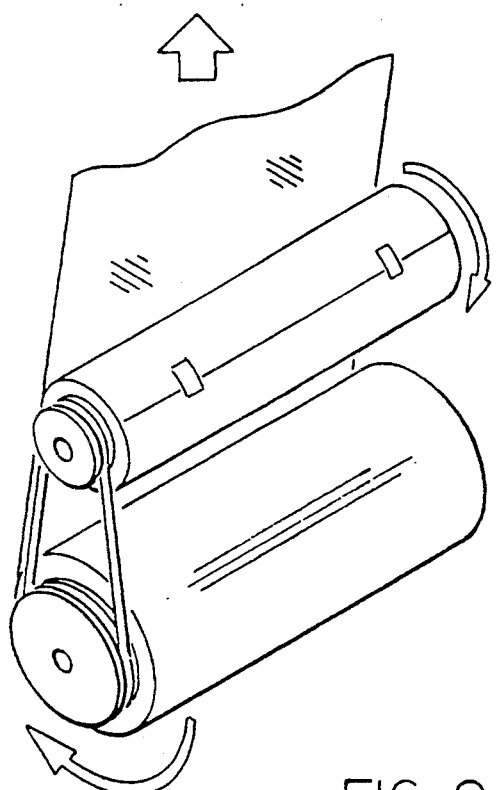
FIGS. 9 AND 10 are schematic representations of the two methods of interconnecting the supply roll pulley with the driven roll pulley in order to accommodate film with the backing sheet rolled onto the inside, FIG. 9, or alternately rolled onto the inside, FIG. 10, of the supply roll.
Figure 10:
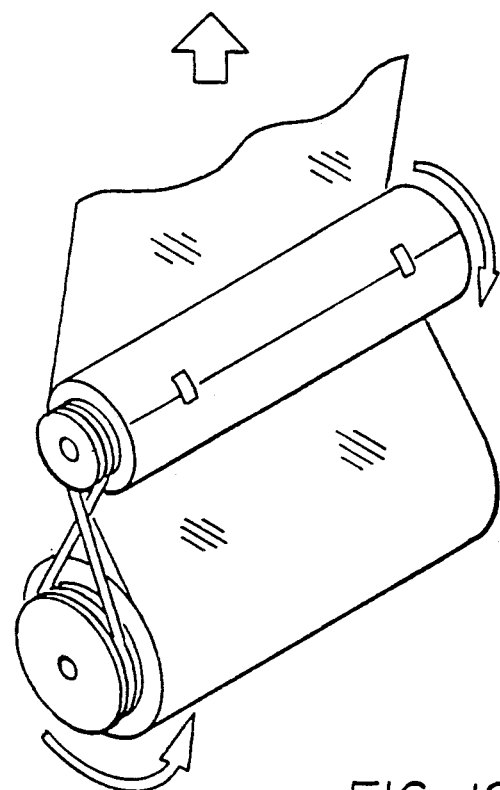

In FIG. 6 is disclosed supply roll 230 mounted between supply roll clamps 231 on either side which are in turn rotatably held on driven pulley axel assembly 235 secured by drive pulley standoff 237. Stripper roll 250 rotatably held by driven pulley axel assembly 255 and is secured by driven pulley standoff 257. Elastic drive band 270 is fastened around both drive pulley 235 and driven pulley 255. FIG. 9 and FIG. 10 show the two methods of winding elastic drive band 270 in order to achieve clockwise/clockwise or counterclockwise/clockwise relative motion between supply roll 230 and stripper roll 260 respectively. FIG. 4 and FIG. 5 show the means of mounting, and relative locations of cutoff blade 272 and slitting blade 310.

Slitting blade 310 is held between supply roll 230 and stripper roll 250. Film guide and ruler 280 which is rigidly attached to frame 20, is used as a mounting surface for slitting blade holder 300 through holder clamp 290. Cutoff blade holder 274 is mounted on third cable 90.

OPERATION OF THE INVENTION

Supply roll 230 and stripper roll 250 are mounted. Slitting blade holder 300 is set at the appropriate position at film guide and ruler 280 and then mounted using holder clamp 290. Slitting blade 310 is mounted into film blade holder 300 and cutoff blade 272 is mounted onto cutoff blade holder 274 with double sided tape 271. Cutoff blade holder 274 is attached to third cable 90 by inserting third cable 90 into mounting slot 273. The leading edge of supply roll 230 is unwound and pulled upward past slitting blade 310 separating the leading edge into two webs. The web to be dispensed is separated into its two components; window film sheet 265 and backing film sheet 260. Backing film sheet 260 and the web which is not dispensed are wound over the top of stripper roll 250 and taped in place. The web of window film 265 to be dispensed is pulled upward through film guide and ruler 280 and then cut off by actuating lever arm 30. Keypad 510 is used to reset calculator 500 and to set the supply roll film length into calculator memory.

Exact lengths of the window film 265 are dispensed by manually pulling each length in turn upward and out of film guide and ruler 280 while watching numeric display 520. Since driven pulley 255 is smaller in diameter than is drive pulley 235 a single rotation of drive pulley 235 causes driven pulley 255 to rotate more than is required to make up the difference between supply roll and stripping roll diameters and results in the maintenance of tension on the film transferring between these rolls. Elastic drive band 270 is designed to slip before the film will break. As supply roll 230 rotates, optical encoder 530 rotates with it and sends a train of electrical pulses to calculator 500 through cable 227 incrementing a running sum buffer; a measure of the length of film removed from supply roll 230. When the desired length of window film 265 is indicated on numeric display 520, lever arm 30 is actuated using the foot while holding window film 265 upward with the hands. Actuation of lever arm 30 pulls second cable 80, rotating drive drum 200 which in turn pulls first cable 70 winding up as many turns as are unwound by second cable 80. Because first cable 70 is attached to lever arm 30 at a point closer to pivot pin 50 than the attachment point of second cable 80, less of first cable 70 is fed to drive drum 200 than is pulled by second cable 80. This difference in cable length transfer is made up by slack stored by spring mounted pulley 110. As lever arm 30 is moved from its rest position to full actuation, spring 108 is stretched developing potential energy and allowing slack in first cable 70 to feed to drive drum 200. When lever arm 30 is released the potential energy stored in spring 108 forces first cable 70 to pull on drive drum 70 in a clockwise rotational direction thus causing second cable 80 to restore lever arm 30 to its original rest position. The rotation of drive drum 200 causes an identical rotation of driven drum 210 which forces third cable 90 to translate and move cutoff blade 272 from one end of holder guide 276 to the other end. This translation of cutoff blade 272 results in severing window film 265. When Lever arm 30 reaches its actuated position, ground contact 226 touches signal contact 225 causing calculator 500 to subtract the figure on numeric display 520 from memory and resetting the running sum buffer and numeric display to zero.

Having thus described my invention what I claim as new, useful and non-obvious and, accordingly secure by Letters Patent of the United States is:

1. A portable device for dispensing a roll of sheet goods comprising:

a rigid frame;
 a lever arm pivotally mounted on said frame, said arm being free to move between an initial position and a final position;
 a drive drum rotationally mounted on said frame;
 a first cable attached at one end to the lever arm and at the other end to the drive drum, being wrapped therearound, one portion of the first cable forming a loop for storage, the loop being held taut by a tension spring;
 a second cable fixed at one end to the frame and at the other end to the drive drum, being wrapped therearound in the opposite sense as said first cable, one portion of the second cable forming a loop for storage, the loop being held taut by said lever arm and being forced to move therewith, so that when said lever arm moves from said initial position to said final position the drive drum is forced to rotate in a first direction wrapping said first cable and unwrapping said second cable on said drum drive and expanding said tension spring, the spring thereafter retracting to rotate the drive drum in a second direction forcing said lever arm to move back to said initial position;
 a driven drum, fixed to said drive drum for rotating with said drive drum;
 a third cable attached at each end to said driven drum, each said end being wrapped in the opposite sense to the other end, the third cable having at least one portion stretched over a horizontal span across said frame, so that when said lever arm is moved from said initial position to said final position and thereafter is returned, the driven drum is forced to rotate to wrap one end of said third cable while unwrapping the other end of said third cable on said driven drum thereby causing said third cable to traverse said horizontal span in first one direction and then in the opposite direction;
 a cutoff blade attached to said third cable for moving with said cable to provide cutting action along said horizontal span;
 a mounting for rotatably supporting said roll of sheet goods on said frame;
 whereby when said sheet goods are unrolled, and passed over said horizontal span, said lever arm may be moved from said initial position to said final position thereby driving said cutoff knife across said sheet goods to sever said sheet goods.

2. The portable device of claim 1 further comprising a stripping roll rotatably mounted on said frame in parallel orientation to said roll of sheet goods, the stripping roll accepting and storing strippable sheet goods selvage removed from said roll of sheet goods.

3. The portable device of claim 2 further comprising means for driving said stripping roll slightly faster than said roll of sheet goods in order to maintain tension on said stripable sheet goods selvage.

4. The portable device of claim 1 further comprising means for longitudinally cutting said sheet goods into two or more separate webs during unwinding.

5. The portable device of claim 1 further comprising means for measurement of a length of sheet goods removed from said supply roll.

6. The portable device of claim 5 further defining said means for measurement as being a contact wheel provided with an optical counter.

7. The portable device of claim 1 further comprising means for measurement of the width of said sheet goods.

* * * * *